United States Patent
Guan et al.

(10) Patent No.: US 11,564,213 B2
(45) Date of Patent: Jan. 24, 2023

(54) COMMUNICATION METHOD AND COMMUNICATIONS APPARATUS

(71) Applicant: HUAWEI TECHNOLOGIES CO., LTD., Guangdong (CN)

(72) Inventors: Peng Guan, Shenzhen (CN); Jianqin Liu, Beijing (CN); Hongzhe Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 17/123,890

(22) Filed: Dec. 16, 2020

(65) Prior Publication Data

US 2021/0105767 A1 Apr. 8, 2021

Related U.S. Application Data

(63) Continuation of application No. PCT/CN2019/091901, filed on Jun. 19, 2019.

(30) Foreign Application Priority Data

Jun. 29, 2018 (CN) .......................... 201810713318.2

(51) Int. Cl.
*H04W 72/04* (2009.01)
*H04W 24/10* (2009.01)

(52) U.S. Cl.
CPC ....... *H04W 72/0413* (2013.01); *H04W 24/10* (2013.01); *H04W 72/046* (2013.01)

(58) Field of Classification Search
CPC ............. H04W 72/0413; H04W 24/10; H04W 72/046; H04W 48/20; H04W 36/0058;
(Continued)

(56) References Cited

U.S. PATENT DOCUMENTS 9,362,997 B2 6/2016 Kim et al.
10,700,752 B2 * 6/2020 Jung .................... H04B 7/0408
(Continued)

FOREIGN PATENT DOCUMENTS

CN 103875191 A 6/2014
CN 104205911 A 12/2014
(Continued)

OTHER PUBLICATIONS

3GPP TS 38.331 V15.2.1 (Jun. 2018), "3rd Generation Partnership Project; Technical Specification Group Radio Access Network; NR; Radio Resource Control (RRC) protocol specification (Release 15)," Jun. 2018, 303 pages.
(Continued)

*Primary Examiner* — Brian T O Connor
(74) *Attorney, Agent, or Firm* — Fish & Richardson P.C.

(57) ABSTRACT

This application discloses communication methods and apparatuses. One method includes: receiving, by a terminal device, a reference signal from a beam of a network device; determining, by the terminal device, availability of the beam based on a threshold and the reference signal; and sending, by the terminal device, feedback information to the network device, wherein the feedback information indicates the availability of the beam.

19 Claims, 6 Drawing Sheets

(58) Field of Classification Search
CPC .. H04W 36/0085; H04B 7/063; H04B 7/0695
See application file for complete search history.

(56) References Cited

U.S. PATENT DOCUMENTS

| | | | | |
|---|---|---|---|---|
| 2018/0199226 | A1* | 7/2018 | Tsai | H04W 24/10 |
| 2018/0227035 | A1* | 8/2018 | Cheng | H04B 7/0695 |
| 2019/0223043 | A1 | 7/2019 | Geng et al. | |
| 2019/0305830 | A1* | 10/2019 | Zhou | H04L 1/1664 |
| 2020/0127726 | A1* | 4/2020 | Gao | H04W 24/10 |
| 2020/0244337 | A1* | 7/2020 | Yuan | H04W 76/27 |
| 2022/0110109 | A1* | 4/2022 | Tsai | H04W 56/0015 |

FOREIGN PATENT DOCUMENTS

| | | |
|---|---|---|
| CN | 107889130 A | 4/2018 |
| CN | 108207030 A | 6/2018 |
| CN | 109923890 A | 6/2019 |
| EP | 2166807 B1 | 12/2010 |
| JP | 2017118462 A | 6/2017 |
| RU | 2629944 C2 | 9/2017 |
| RU | 2634695 C2 | 11/2017 |
| WO | 2018059487 A1 | 4/2018 |

OTHER PUBLICATIONS

Office Action in Chinese Application No. 201810713318.2, dated Mar. 22, 2021, 7 pages.

3GPP TS 38.133 V15.1.0 (Mar. 2018), "3rd Generation Partnership Project;Technical Specification Group Radio Access Network; NR;Requirements for support of radio resource management(Release 15)," Mar. 2018, 59 pages.

3GPP TS 38.211 V15.1.0 (Mar. 2018), "3rd Generation Partnership Project; Technical Specification Group Radio Access Network; NR; Physical channels and modulation (Release 15)," Mar. 2018, 90 pages.

3GPP TS 38.212 V15.1.0 (Mar. 2018), "3rd Generation Partnership Project;Technical Specification Group Radio Access Network;NR;Multiplexing and channel coding(Release 15)," Mar. 2018, 94 pages.

3GPP TS 38.213 V15.1.0 (Mar. 2018), "3rd Generation Partnership Project;Technical Specification Group Radio Access Network;NR;Physical layer procedures for control(Release 15)," Mar. 2018, 77 pages.

3GPP TS 38.214 V15.1.0 (Mar. 2018), "3rd Generation Partnership Project;Technical Specification Group Radio Access Network;NR;Physical layer procedures for data (Release 15)," Mar. 2018, 77 pages.

3GPP TS 38.321 V15.2.0 (Jun. 2018), "3rd Generation Partnership Project;Technical Specification Group Radio Access Network;NR;Medium Access Control (MAC) protocol specification(Release 15)," Jun. 2018, 73 pages.

3GPP TS 38.331 V15.1.0 (Mar. 2018), "3rd Generation Partnership Project;Technical Specification Group Radio Access Network;NR-;Radio Resource Control (RRC) protocol specification(Release 15)," Mar. 2018, 268 pages.

3GPP TS 38.331 V15.2.0 (Jun. 2018), "3rd Generation Partnership Project;Technical Specification Group Radio Access Network; NR;Radio Resource Control (RRC) protocol specification(Release 15)," Jun. 2018, 304 pages.

Office Action issued in Chinese Application No. 201810713318.2 dated Nov. 9, 2020, 12 pages (with English translation).

PCT International Search Report and Written Opinion issued in International Application No. PCT/CN2019/091901 dated Aug. 27, 2019, 13 pages (with English translation).

Samsung, "Discussion on Beam Measurement and Tracking for 5G New Radio Interface in mmWave Frequency Bands", 3GPP TSG RAN WG2 #93bis, R2-162226, Dubrovnik, Croatia, Apr. 11-15, 2016, 5 pages.

3GPP TS 36.331 V15.1.0 (Mar. 2018), "3rd Generation Partnership Project; Technical Specification Group Radio Access Network; Evolved Universal Terrestrial Radio Access (E-UTRA); Radio Resource Control (RRC); Protocol specification (Release 15)," Mar. 2018, 893 pages.

Ericsson, "Measurement report content for A 1-A6 events," 3GPP TSG-RAN WG2 #97bis, R2-1702799, Spokane, USA, Apr. 3-7, 2017, 3 pages.

Extended European Search Report issued in European Application No. 19827228.8 dated Jul. 8, 2021, 14 pages.

LG Electronics Inc, "Serving beam management," 3GPP TSG-RAN WG2 NR Ad-Hoc, R2-1700557, Spokane, UAS, Jan. 17-19, 2017, 2 pages.

Nokia et al., "Beam management," 3GPP TSG-RAN WG2 Meeting #98, R2-1705440, Hangzhou, China, May 15-19, 2017, 3 pages.

Nokia et al., "Mobility Measurements in Connected Mode," 3GPP TSG-RAN WG2 Meeting #98, R2-1705396, Hangzhou, China, May 15-19, 2017, 6 pages.

Office Action issued in Russian Application No. 2021101409/07(002731) dated Mar. 4, 2022, 14 pages (with English translation).

Office Action issued in Japanese Application No. 2020-573327 dated Jul. 26, 2022, 5 pages (with English translation).

* cited by examiner

COMMUNICATION METHOD AND COMMUNICATIONS APPARATUS

CROSS-REFERENCE TO RELATED APPLICATIONS

This application is a continuation of International Application No. PCT/CN2019/091901, filed on Jun. 19, 2019, which claims priority to Chinese Patent Application No. 201810713318.2, filed on Jun. 29, 2018. The disclosures of the aforementioned applications are hereby incorporated by reference in their entireties.

TECHNICAL FIELD

This application relates to the field of wireless communications technologies, and in particular, to a communication method and a communications apparatus.

BACKGROUND

Compared with a fourth generation mobile communications system, a fifth generation mobile communications system uses a higher carrier frequency. A higher carrier frequency indicates severer fading of a radio signal. Therefore, a beamforming (BF) technology is proposed in the fifth generation mobile communications system. With the BF technology, a beam with good directivity can be obtained, and a power of the radio signal in a transmit direction can be increased, to resist the fading of the radio signal.

In the 3rd generation partnership project (3GPP) release 15 (R15), a method for measuring beam quality is provided. Specifically, a base station sends beam resource configuration information to a terminal device, where the beam resource configuration information is used to notify the terminal device of information such as time-frequency domain resource locations and periodicities of reference signals sent by the base station on different beams. The base station sends the reference signals on the different beams based on the beam resource configuration information. The terminal device may receive the reference signals on corresponding beams, and may feed back a beam quality measurement report to the base station based on the reference signals received on the different beams, so that the base station learns of quality of communication using the different beams. In the prior art, there is no related solution about how the terminal device feeds back the beam quality measurement report to the base station.

SUMMARY

This application provides a communication method and a communications apparatus, to provide a solution in which a terminal device feeds back a beam quality measurement report.

According to a first aspect, this application provides a communication method. The method is specifically as follows: A terminal device receives a first reference signal from a first beam of a network device. The terminal device determines availability of the first beam based on a first threshold and the first reference signal. The terminal device sends first feedback information to the network device, where the first feedback information includes at least first indication information, and the first indication information is used to indicate the availability of the first beam.

Compared with air interface overheads and physical uplink resource utilization in a case in which the terminal device feeds back an identifier of the first beam and a receive power of the first reference signal to the network device when the terminal device receives the first reference signal through the first beam, in the method, air interface overheads can be reduced, and physical uplink resource utilization can be improved.

According to a second aspect, this application provides a communication method. The method is specifically as follows: A terminal device receives a first reference signal from a first beam of a network device. The terminal device determines availability of the first beam based on a first threshold and the first reference signal. The terminal device sends first indication information to the network device, where the first indication information is used to indicate the availability of the first beam. In this embodiment of this application, compared with air interface overheads and physical uplink resource utilization in a case in which the terminal device feeds back an identifier of the first beam and a receive power of the first reference signal, in a manner of directly feeding back, by the terminal device, availability of a beam, air interface overheads can be reduced, and physical uplink resource utilization can be improved.

In a possible implementation, the first threshold in the first aspect and the second aspect may be determined by the terminal device, or may be determined by the network device, or may be specified in advance in a protocol, and then set in the terminal device and the network device. In this example, if the first threshold is determined by the network device, the terminal device may receive first configuration information from the network device, where the first configuration information includes the first threshold. If the first threshold is determined by the terminal device, the terminal device may send second indication information to the network device, where the second indication information carries the first threshold, and the second indication information is not limited to be carried in first feedback information.

In a possible implementation, there are one or more first thresholds. If there is one first threshold, there is one piece of first indication information, and the first indication information is used to indicate the availability of the first beam according to a decision criterion of the first threshold. Alternatively, if there are a plurality of first thresholds, there are a plurality of pieces of first indication information, and each piece of first indication information is used to indicate the availability of the first beam according to a decision criterion of a corresponding first threshold.

In a possible implementation, a signaling format of the first feedback information is a media access control protocol data unit, the media access control protocol data unit includes a control element, and the control element carries the first indication information. Alternatively, a signaling format of the first feedback information is uplink control information, and the uplink control information carries the first indication information.

In a possible implementation, the terminal device may determine the availability of the first beam in the following manner: The terminal device determines a quality parameter associated with the first reference signal. If the quality parameter is greater than or equal to the first threshold, the terminal device determines that the first beam is available. Alternatively, if the quality parameter is less than the first threshold, the terminal device determines that the first beam is unavailable. This embodiment of this application is not limited to the following case: If the quality parameter is greater than the first threshold, the terminal device determines that the first beam is available; if the quality parameter is less than or equal to the first threshold, the terminal device determines that the first beam is unavailable. The quality parameter includes one or more of the following: a reference signal received power, reference signal received quality, a reference signal received strength indicator, a signal to interference plus noise ratio, a signal quality indicator, a rank indicator, and a precoding matrix indicator.

In a possible implementation, the terminal device may receive second configuration information from the network device, where the second configuration information is used to indicate an available beam set, and the available beam set may include one or more available beams. This is not limited in this application.

According to a third aspect, this application further provides a communication method, where the method is specifically as follows: A network device generates a first reference signal. The network device sends the first reference signal to a terminal device through a first beam. The network device receives first feedback information from the terminal device, where the first feedback information is determined based on the first reference signal and a first threshold, the first feedback information includes at least first indication information, and the first indication information is used to indicate availability of the first beam.

According to a fourth aspect, this application further provides a communication method, where the method is specifically as follows: A network device generates a first reference signal. The network device sends the first reference signal to a terminal device through a first beam. The network device receives first indication information from the terminal device, where the first indication information is used to indicate availability of the first beam, and the availability of the first beam is determined based on a first threshold and the first reference signal.

In a possible implementation, the network device sends first configuration information to the terminal device, where the first configuration information includes the first threshold. Alternatively, the first feedback information further includes second indication information, where the second indication information is used to indicate the first threshold. In this embodiment of this application, there are one or more first thresholds. If there is one first threshold, there is one piece of first indication information, and the first indication information is used to indicate the availability of the first beam according to a decision criterion of the first threshold. Alternatively, if there are a plurality of first thresholds, there are a plurality of pieces of first indication information, and each piece of first indication information is used to indicate the availability of the first beam according to a decision criterion of a corresponding first threshold.

In a possible implementation of this application, a signaling format of the first feedback information is a media access control protocol data unit, the media access control protocol data unit includes a control element, and the control element carries the first indication information. Alternatively, a signaling format of the first feedback information is uplink control information, and the uplink control information carries the first indication information.

In a possible implementation of this application, the network device may generate an available beam set based on the first feedback information. The network device sends second configuration information to the terminal device, where the second configuration information is used to indicate the available beam set. The available beam set may include one or more available beams.

According to a fifth aspect, this application provides a communications apparatus, applied to a terminal device, and including units or means configured to perform the steps in the first aspect and the second aspect.

For example, in an example of this application, the communications apparatus may include a receiving module, a processing module, and a sending module. The receiving module may be configured to receive a first reference signal from a first beam of a network device. The processing module may be configured to determine availability of the first beam based on a first threshold and the first reference signal. The sending module may be configured to send first feedback information to the network device, where the first feedback information includes at least first indication information, and the first indication information is used to indicate the availability of the first beam.

For another example, in another example of this application, the communications apparatus may include a receiving module, a processing module, and a sending module. The receiving module is configured to receive a first reference signal from a first beam of a network device. The processing module may be configured to determine availability of the first beam based on a first threshold and the first reference signal. The sending module may be configured to send first indication information to the network device.

In a possible implementation of this application, the receiving module is further configured to receive first configuration information from the network device, where the first configuration information includes the first threshold.

In a possible implementation of this application, the first feedback information further includes second indication information, where the second indication information is used to indicate the first threshold.

In a possible implementation of this application, there are one or more first thresholds. If there is one first threshold, there is one piece of first indication information, and the first indication information is used to indicate the availability of the first beam according to a decision criterion of the first threshold. Alternatively, if there are a plurality of first thresholds, there are a plurality of pieces of first indication information, and each piece of first indication information is used to indicate the availability of the first beam according to a decision criterion of a corresponding first threshold.

In a possible implementation of this application, a signaling format of the first feedback information is a media access control protocol data unit, the media access control protocol data unit includes a control element, and the control element carries the first indication information.

In a possible implementation of this application, a signaling format of the first feedback information is uplink control information, and the uplink control information carries the first indication information.

In a possible implementation of this application, the processing module is specifically configured to: determine a quality parameter associated with the first reference signal; and if the quality parameter is greater than or equal to the first threshold, determine that the first beam is available; or if the quality parameter is less than the first threshold, determine that the first beam is unavailable.

In a possible implementation of this application, the quality parameter includes one or more of the following: a reference signal received power, reference signal received quality, a reference signal received strength indicator, a signal to interference plus noise ratio, a signal quality indicator, a rank indicator, and a precoding matrix indicator.

In a possible implementation of this application, the receiving module is further configured to receive second configuration information from the network device, where the second configuration information is used to indicate an available beam set.

According to a sixth aspect, this application provides a communications apparatus, applied to a network device, and including units or means configured to perform the steps in the second aspect and the third aspect.

For example, in an example of this application, the communications apparatus may include a processing module, a sending module, and a receiving module. The processing module may be configured to generate a first reference signal. The sending module may be configured to send the first reference signal to a terminal device through a first beam. The receiving module is configured to receive first feedback information from the terminal device, where the first feedback information is determined based on the first reference signal and a first threshold, the first feedback information includes at least first indication information, and the first indication information is used to indicate availability of the first beam.

For example, in another example of this application, the communications apparatus may include a processing module, a sending module, and a receiving module, specifically as follows. The processing module may be configured to generate a first reference signal. The sending module may be configured to send the first reference signal to a terminal device through a first beam. The receiving module may be configured to receive first indication information from the terminal device, where the first indication information is used to indicate availability of the first beam.

In a possible implementation of this application, the sending module is further configured to send first configuration information to the terminal device, where the first configuration information includes the first threshold.

In a possible implementation of this application, the first feedback information further includes second indication information, where the second indication information is used to indicate the first threshold.

In a possible implementation of this application, there are one or more first thresholds. If there is one first threshold, there is one piece of first indication information, and the first indication information is used to indicate the availability of the first beam according to a decision criterion of the first threshold. Alternatively, if there are a plurality of first thresholds, there are a plurality of pieces of first indication information, and each piece of first indication information is used to indicate the availability of the first beam according to a decision criterion of a corresponding first threshold.

In a possible implementation of this application, a signaling format of the first feedback information is a media access control protocol data unit, the media access control protocol data unit includes a control element, and the control element carries the first indication information.

In a possible implementation of this application, a signaling format of the first feedback information is uplink control information, and the uplink control information carries the first indication information.

In a possible implementation of this application, the processing module may be further configured to generate an available beam set based on the first feedback information. The sending module is further configured to send second configuration information to the terminal device, where the second configuration information is used to indicate the available beam set.

According to a seventh aspect, this application provides a communications apparatus, applied to a terminal device, and including at least one processing element and at least one storage element, where the at least one storage element is configured to store a program and data, and the at least one processing element is configured to perform the method provided in the first aspect or the second aspect of this application.

According to an eighth aspect, this application provides a communications apparatus, applied to a network device, and including at least one processing element and at least one storage element, where the at least one storage element is configured to store a program and data, and the at least one processing element is configured to perform the method provided in the third aspect or the fourth aspect of this application.

According to a ninth aspect, this application provides a communications apparatus, applied to a terminal device, and including at least one processing element (or chip) configured to perform the method in the first aspect or the second aspect.

According to a tenth aspect, this application provides a communications apparatus, applied to a network device, and including at least one processing element (or chip) configured to perform the method in the fourth aspect or the third aspect.

The foregoing apparatuses may be network devices or terminal devices, or may be chips or function modules in network devices or terminal devices.

According to an eleventh aspect, this application provides a program, where the program is used to perform the method in any one of the foregoing aspects when being executed by a processor.

According to a twelfth aspect, this application provides a program product, for example, a computer-readable storage medium, including the program in any one of the foregoing aspects.

According to a thirteenth aspect, an embodiment of this application provides a mobile communications system, and the mobile communications system includes a terminal device and a network device.

DESCRIPTION OF EMBODIMENTS

The following describes the technical solutions in the embodiments of this application with reference to the accompanying drawings in the embodiments of this application.

Figure 1:
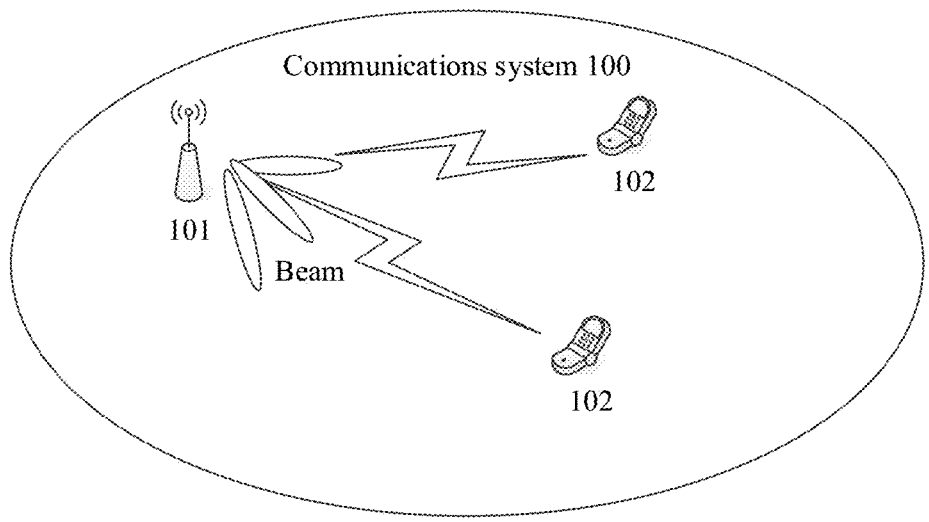
FIG. 1 is a schematic diagram of a communications system according to an embodiment of this application.

FIG. 1 shows a communications system 100 according to an embodiment of this application. The communications system 100 may include a network device 101 and a terminal device 102.

The network device 101 may provide a radio access-related service for the terminal device 102, to implement one or more of the following functions: a radio physical layer function, a resource scheduling and radio resource management function, a quality of service (QoS) management function, a radio access control function, and a mobility management function. The terminal device 102 may access the network device 101 by using an air interface. In this embodiment of this application, the network device 101 may communicate with the terminal device 102 through a beam.

This application provides a beam quality measurement method. Specifically, the network device 101 may send a first reference signal to the terminal device 102 through a first beam, and the terminal device 102 may generate a beam quality measurement report of the first beam based on the first reference signal received on the first beam, and feeds back the beam quality measurement report of the first beam to the network device 101.

In an example of this application, a format of the beam quality measurement report that is of the first beam and that is fed back by the terminal device 102 may be {an identifier of the first beam, a receive power of the first reference signal}. It can be learned that the beam quality measurement report that is of the first beam and that is fed back by the terminal device 102 includes two parts of content: the identifier of the first beam, and a power of the first reference signal received on the first beam. Consequently, air interface overheads are relatively high.

For example, the first beam includes a total of 64 beams, and an identifier of each beam occupies 6 bits ($\log_2 64=6$). In addition, in the 64 beams, a beam whose reference signal received power is the largest occupies 7 bits, and the remaining 63 beams whose reference signal received powers need to be reported in a differential manner occupy 4 bits each. To be specific, based on the foregoing specified format for feeding back the beam quality measurement report, when there are the 64 beams, a quality measurement report of one beam occupies 13 bits, and quality measurement reports of the remaining 63 beams occupy 10 bits each. If a terminal device feeds back the quality measurement reports of the 64 beams, a total of $13+10\times63=643$ bits are occupied. Consequently, the air interface overheads are relatively high.

Based on the foregoing description, this application provides a communication method. According to the communication method, the overheads of feeding back the beam quality measurement report by the terminal device can be reduced. A main principle is as follows: When receiving the first reference signal through the first beam, the terminal device determines availability of the first beam based on the first reference signal and a first threshold, and then directly feeds back the availability of the first beam to a network device. Compared with air interface overheads in a case in which the terminal device feeds back the identifier of the first beam and the receive power of the first reference signal to the network device, the air interface overheads can be reduced in the method.

For ease of understanding, descriptions of concepts related to this application are provided for reference by using examples, shown as follows:

(1) Beam: A beam is a communication resource, and the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like. Different beams may be considered as different communication resources, and same information or different information may be sent through different beams. Optionally, a plurality of beams having a same or similar communication feature may be considered as one beam, and the beam may include one or more antenna ports used to transmit a data channel, a control channel, a sounding signal, and the like. For example, a transmit beam may be signal strength distribution formed in different directions in space after a signal is transmitted by using an antenna, and a receive beam may be signal strength distribution in different directions in space of a radio signal received from the antenna. It may be understood that one or more antenna ports forming the beam may also be considered as one antenna port set, the beam may also be referred to as a spatial filter, the transmit beam may also be referred to as a spatial transmit filter, and the receive beam may also be referred to as a spatial receive filter.

(2) A beam management resource is a resource used for beam management, and may also be represented as a resource used to calculate and measure beam quality. The beam quality includes a layer 1 reference signal received power (L1-RSRP), layer 1 reference signal received quality (L1-RSRQ), and the like. Specifically, the beam management resource may include a synchronization signal (SS), a synchronization signal block (SSB), a synchronization signal/physical broadcast channel block (SS/PBCH block), a broadcast channel, a broadcast channel demodulation reference signal, a tracking reference signal, a downlink channel measurement reference signal, a downlink control channel demodulation reference signal, a downlink shared channel demodulation reference signal, an uplink sounding reference signal, an uplink random access signal, and the like.

(3) Beam indication information is used to indicate a beam used for transmission, where the beam includes at least one of a transmit beam and a receive beam. The beam indication information may include at least one of a beam number, a beam management resource number, an uplink signal resource number, a downlink signal resource number, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a reception codebook corresponding to a beam, a transmit codebook corresponding to a beam, an index of a reception codebook corresponding to a beam, and an index of a transmit codebook corresponding to a beam. The downlink signal includes any one of a synchronization signal, a broadcast channel, a broadcast signal demodulation signal, a channel state information downlink signal (CSI-RS), a cell-specific reference signal (CS-RS), a UE-specific reference signal (US-RS), a downlink control channel demodulation reference signal, a downlink data channel demodulation reference signal, and a downlink phase noise tracking signal. The uplink signal includes any one of an uplink random access sequence, an uplink sounding reference signal, an uplink control channel demodulation reference signal, an uplink data channel demodulation reference signal, and an uplink phase noise tracking signal. Optionally, the network device may further allocate a QCL identifier to a beam that has a QCL relationship and that is in beams associated with a frequency resource group. The beam may also be referred to as a spatial transmission filter, the transmit beam may also be referred to as a spatial transmit filter, and the receive beam may also be referred to as a spatial receive filter. The beam indication information may be further represented as a transmission configuration index (TCI). The TCI may include a plurality of parameters such as a cell number, a bandwidth part number, a reference signal identifier, a synchronization signal block identifier, and a QCL type.

(4) The network device may be a device that is in a network and that connects the terminal device to a wireless network. The network device is a node in a radio access network, and may also be referred to as a base station, or may be referred to as a radio access network (RAN) node (or device). Currently, for example, the network device is a gNB, a transmission reception point (TRP), an evolved NodeB (eNB), a radio network controller (RNC), a NodeB (NB), a base station controller (BSC), a base transceiver station (base transceiver station, BTS), a home base station (for example, a home evolved NodeB or a home Node B, HNB), a baseband unit (BBU), or a wireless fidelity (Wi-fi) access point (AP). In addition, in a network structure, the network device may include a centralized unit (CU) node and a distributed unit (DU) node. In this structure, a protocol layer of an eNB in a long-term evolution (LTE) system is divided, where some functions of the protocol layer are centrally controlled by the CU, the remaining functions or all functions of the protocol layer are distributed in the DU, and the DU is centrally controlled by the CU.

(5) The terminal device, also referred to as user equipment (UE), a mobile station (MS), a mobile terminal (MT) or the like, is a device providing voice and/or data connectivity for a user, for example, a handheld device or a vehicle-mounted device that has a wireless connection function. Currently, for example, the terminal device is a mobile phone (mobile phone), a tablet computer, a notebook computer, a palmtop, a mobile internet device (MID), a wearable device, a virtual reality (VR) device, an augmented reality (AR) device, a wireless terminal in industrial control, a wireless terminal in self driving, a wireless terminal in a remote surgery, a wireless terminal in a smart grid, a wireless terminal in transportation safety (transportation safety), a wireless terminal in a smart city, a wireless terminal in a smart home, or the like.

(6) A communications system may be a system of various radio access technologies (radio access technology, RAT) such as a code division multiple access (CDMA), time division multiple access (TDMA), frequency division multiple access (FDMA), orthogonal frequency division multiple access (OFDMA), single carrier frequency division multiple access (single carrier FDMA, SC-FDMA), or another system. The terms "system" and "network" can be interchanged with each other. The CDMA system may implement radio technologies such as universal terrestrial radio access (UTRA) and CDMA2000. The UTRA may include a wideband CDMA (WCDMA) technology and other variant technologies of CDMA. The CDMA2000 may cover interim standard (IS) 2000 (IS-2000), IS-95, and IS-856. The TDMA system may implement radio technologies such as a global system for mobile communications (GSM). The OFDMA system may implement radio technologies such as evolved universal radio terrestrial access (evolved UTRA, E-UTRA), ultra mobile broadband (UMB), IEEE 802.11 (Wi-Fi), IEEE 802.16 (WiMAX), IEEE 802.20, and Flash OFDMA. The UTRA corresponds to a universal mobile telecommunications system (UMTS), and the E-UTRA corresponds to an evolved version of the UMTS. 3GPP long-term evolution (LTE) and various versions evolved based on LTE are redactions using E-UTRA UMTS. In addition, the communications system may be further applicable to future-oriented communications technologies. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of a network architecture and the emergence of new service scenarios, the technical solutions provided in the embodiments of this application are also applicable to similar technical problems.

In addition, it should be understood that, in descriptions of this application, terms such as "first" and "second" are merely used for differentiation and description, but cannot be understood as an indication or implication of relative importance or an indication or implication of an order.

Figure 2:
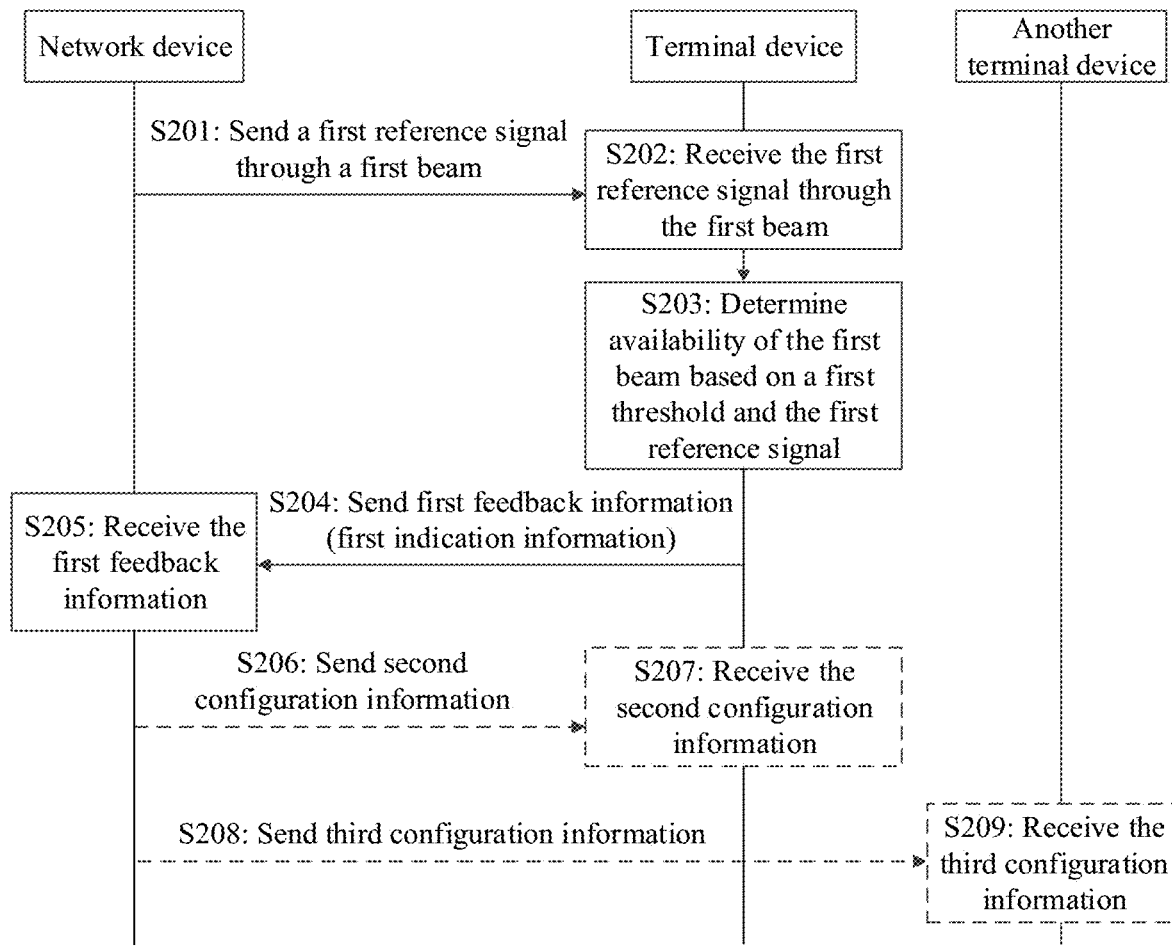
FIG. 2 is a flowchart of a communication method according to an embodiment of this application.

As shown in FIG. 2, this application provides a procedure of a communication method. The communication method is mainly used for downlink beam management of a downlink reference signal. In the procedure shown in FIG. 2, a first reference signal may be specifically the downlink reference signal, and a first beam may be specifically a downlink beam. Step S201 and step S205 may be performed by the network device 101 in the communications system 100 shown in FIG. 1, or may be performed by an apparatus such as a chip or a chip system, that supports a network device in implementing step S201 and step S205. In this embodiment of this application, an example in which step S201 and step S205 are performed by the network device is used for description. Step S202 to step S204 may be performed by the terminal device 102 in the communications system 100 shown in FIG. 1, or may be performed by an apparatus such as a chip or a chip system, that supports a terminal device in implementing step S202 to step S204. In this embodiment of this application, an example in which step S202 to step S204 are performed by the terminal device is used for description.

Step S201: The network device sends the first reference signal through the first beam.

In this embodiment of this application, the first reference signal may be any one or more of the following signals: a channel state information reference signal (CSI-RS), a synchronization signal, a broadcast channel, a broadcast signal demodulation signal, a cell-specific reference signal (CS-RS), a UE-specific reference signal (US-RS), a tracking reference signal (TRS), a downlink control channel demodulation reference signal, a downlink data channel demodulation reference signal, and a downlink phase noise tracking signal.

Step S202: The terminal device receives the first reference signal through the first beam.

Step S203: The terminal device determines availability of the first beam based on a first threshold and the first reference signal.

In this embodiment of this application, the first threshold may be pre-agreed on by the terminal device and the network device, and may be set in the terminal device. Alternatively, the first threshold may be determined by the terminal device and then notified to the network device. Alternatively, the first threshold is determined by the network device and then notified to the terminal device. In this embodiment of this application, the terminal device may include the first threshold in capability reporting information of the terminal device, or include the first threshold in uplink control information (UCI), or include the first threshold in a media access control control element (MAC CE). The terminal device then transmits the first threshold through an uplink control channel or through an uplink data channel.

In this embodiment of this application, a manner of determining the availability of the first beam based on the first threshold and the first reference signal may include but is not limited to the following example manners:

Example 1: The terminal device determines a quality parameter associated with the first reference signal. If the quality parameter is greater than or equal to the first threshold, the terminal device determines that the first beam is available. Alternatively, if the quality parameter is less than the first threshold, the terminal device determines that the first beam is unavailable.

Example 2: The terminal device determines a quality parameter associated with the first reference signal. If the quality parameter is greater than the first threshold, the terminal device determines that the first beam is available. Alternatively, if the quality parameter is less than or equal to the first threshold, the terminal device determines that the first beam is unavailable.

In Example 1 and Example 2 of this application, the quality parameter associated with the first reference signal may include one or more of the following: a reference signal received power (RSRP), reference signal received quality (RSRQ), a received signal strength indicator (RSSI), a signal to interference plus noise ratio (SINR), a channel quality indicator (CQI), a rank indicator (RI), a precoding matrix indicator (PMI), and a block error rate (BLER). In this embodiment of this application, that beam availability is calculated by using one or more of the foregoing quality parameters may be configured to the terminal device and the network device by using a network device configuration or in a protocol pre-defined manner.

It should be noted that, in this embodiment of this application, for parameters such as the reference signal received power, the reference signal received quality, the reference signal received strength indicator, the signal to interference plus noise ratio, the channel quality indicator, the rank indicator, and the precoding matrix indicator, a larger value indicates better beam availability and better channel quality. For the block error rate, a larger value indicates poorer beam availability and poorer channel quality.

Optionally, when comparing the first threshold with the quality parameter that is associated with the first reference signal and that is obtained through measurement, the terminal device may scale, based on a transmit power of the first reference signal, the first threshold or the quality parameter that is obtained through measurement. For example, the first threshold is set based on a reference that a transmit power is X dBm, and the transmit power of the first reference signal is X+y dBm. When comparing the first threshold with the quality parameter associated with the first reference signal, the terminal device may decrease, by a value related to y, the quality parameter obtained through measurement, and then may compare the quality parameter with the first threshold, or may increase the first threshold by a value related to y, and then may compare the quality parameter obtained through measurement with the first threshold.

Optionally, the first threshold may be related to at least one of the following thresholds: a beam failure determining threshold, a candidate beam threshold, a link failure (out-of-sync) threshold, a link synchronization (in-sync) threshold, and a cell reselection event determining threshold.

Optionally, for different beam management resources, the first threshold may be different. For example, when a beam management resource is a CSI-RS, the first threshold is a; when a beam management resource is an SSB, the first threshold is b.

In Example 1 and Example 2 of this application, when the quality parameter associated with the first reference signal is the reference signal received power, the reference signal received quality, or the reference signal received strength indicator, the terminal device may receive and measure the first reference signal, to obtain a reference signal received power of the first reference signal, reference signal received quality of the first reference signal, or a reference signal received strength indicator of the first reference signal. In this embodiment of this application, if the terminal device measures the first reference signal to obtain the reference signal received power of the first reference signal, the first threshold is set by using the reference signal received power as a measurement unit. Similarly, if the terminal device measures the first reference signal to obtain the reference signal received quality of the first reference signal, the first threshold is set by using the reference signal received quality as a measurement unit. If the terminal device measures the first reference signal to obtain the reference signal received strength indicator of the first reference signal, the first threshold is set by using the reference signal received strength indicator as a measurement unit.

Optionally, in this embodiment of this application, when the quality parameters associated with the first reference signal are the reference signal received power or the reference signal received quality, the terminal device may receive and measure the first reference signal, to obtain the reference signal received power or the reference signal received quality of the first reference signal, and then may measure the reference signal received power or the reference signal received quality of the first reference signal. Specifically, if measuring the first reference signal to obtain the reference signal received power of the first reference signal, the terminal device may measure the reference signal received power of the first reference signal to obtain a reference signal received power indicator of the first reference signal. Correspondingly, the first threshold is set by using the reference signal received power indicator as a measurement unit. If measuring the first reference signal to obtain the reference signal received quality of the first reference signal, the terminal device may measure the reference signal received quality of the first reference signal to obtain the reference signal received quality indicator of the first reference signal. Correspondingly, the first threshold is set by using the reference signal received quality indicator as a measurement unit.

In this embodiment of this application, when the quality parameter associated with the first reference signal is the signal to interference plus noise ratio, the terminal device may receive and measure the first reference signal, to obtain a strength of the first reference signal and a strength of an interference signal. The terminal device then obtains the signal to interference plus noise ratio based on the strength of the first reference signal and the strength of the interference signal. Correspondingly, the first threshold is set by using the signal to interference plus noise ratio as a measurement unit.

In this embodiment of this application, when the quality parameters associated with the first reference signal are the channel quality indicator (CQI), the rank indicator (RI), the precoding matrix indicator (PMI), or the block error rate (BLER), the terminal device may measure the first reference signal, to obtain the channel quality indicator, the rank indicator, the precoding matrix indicator, or the block error rate. For example, if the terminal device measures the first reference signal to obtain the channel quality indicator, the first threshold is set by using the channel quality indicator as a measurement unit. Similarly, if the terminal device measures the first reference signal to obtain the rank indicator, the first threshold is set by using the rank indicator as a measurement unit. If the terminal device measures the first reference signal to obtain the precoding matrix indicator, the first threshold is set by using the precoding matrix indicator as a measurement unit. If the terminal device measures the first reference signal to obtain the block error rate, the first threshold is set by using the block error rate as a measurement unit.

Step S204: The terminal device sends first feedback information, where the first feedback information may include first indication information, and the first indication information is used to indicate the availability of the first beam.

In this embodiment of this application, the terminal device may send the first feedback information by using a second beam that matches the first beam. A matching relationship between the first beam and the second beam is preconfigured for the terminal device, and the second beam is the same as or different from the first beam. Certainly, in this embodiment of this application, a correspondence between the first beam and the second beam is not limited. For example, the second beam may alternatively be unrelated to the first beam. Alternatively, the terminal device may include the first feedback information in capability reporting information of the terminal device, or include the first feedback information in the uplink control information (UCI), or include the first feedback information in the media access control control element (MAC CE). The terminal device then transmits the first feedback information through the uplink control channel or through the uplink data channel. In this embodiment of this application, a manner of sending the first feedback information is not limited.

In this embodiment of this application, if the first indication information is a first value, it may indicate that the first beam is available; if the first indication information is a second value, it may indicate that the first beam is unavailable. The first value is different from the second value. The first value and the second value each may be represented by one binary bit, or each may be represented by a plurality of binary bits. For example, a binary bit 0 may be used to represent that the first beam is unavailable, and a binary bit 1 may be used to represent that the first beam is available. Alternatively, a binary bit 1 may be used to represent that the first beam is unavailable, and a binary bit 0 may be used to indicate that the first beam is available.

In an example of this application, a signaling format of the first feedback information may be a media access control protocol data unit (MAC PDU), the MAC PDU may include a control element (CE), and the CE may carry the first indication information.

Figure 3:
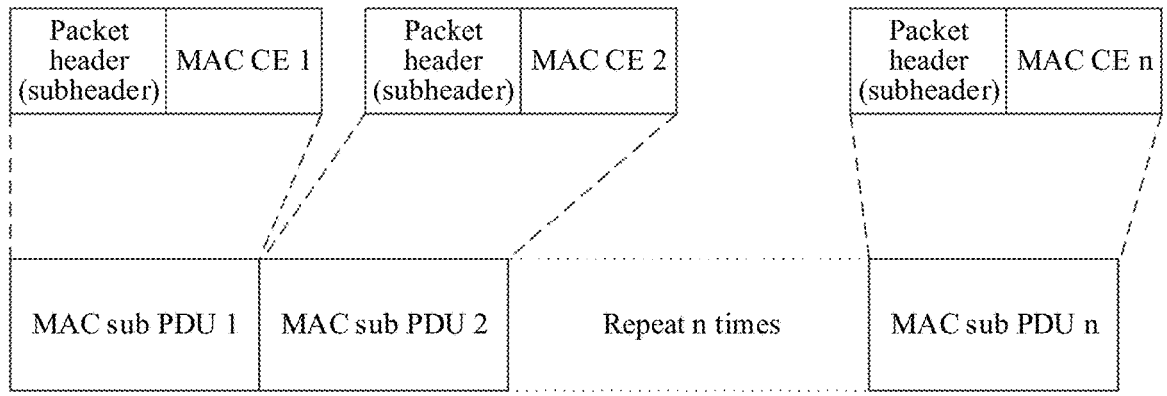
FIG. 3 is a schematic diagram of a MAC PDU according to an embodiment of this application.

For example, in an example of this application, the MAC PDU may include one or more media access control sub-protocol data units (MAC sub PDU), and each MAC sub PDU includes a packet header (subheader) and a MAC CE, where the MAC CE may be fixed-sized, or may be variable-sized. For example, as shown in FIG. 3, in an example of the MAC PDU, the MAC PDU may include n MAC sub PDUs: a MAC sub PDU 1, a MAC sub PDU 2, . . . , and a MAC sub PDU n. The MAC sub PDU 1 may include a packet header and a MAC CE 1, where the MAC CE 1 may be fixed-sized. The MAC sub PDU 2 may include a packet header and a MAC CE 2, where the MAC CE 2 may be variable-sized. The MAC sub PDU n may include a packet header and a MAC CE n, where the MAC CE n is variable-sized.

In another example of this application, a signaling format of the first feedback information may be the uplink control information (UCI), and the UCI may carry the first indication information. For example, in this embodiment of this application, availability of a total of 64 beams is fed back, and the availability of each beam is represented by one binary bit. In this case, 64-bit fixed-sized UCI in which each bit represents availability of one beam may be set.

Step S205: The network device receives the first feedback information.

It can be learned from the foregoing descriptions that in this embodiment of this application, a beam quality measurement report that is of the first beam and that is fed back by the terminal device includes only the first indication information, where the first indication information is used to indicate the availability of the first beam. Compared with air interface overheads and air interface utilization in the foregoing solution in which the beam quality measurement report of the first beam includes an identifier of the first beam and the receive power of the first reference signal, in this embodiment, air interface overheads can be reduced, and air interface utilization can be improved.

Optionally, in this embodiment of this application, for the procedure shown in FIG. 2, after step S205, the method may further include the following steps.

Step S206: The network device sends second configuration information, where the second configuration information is used to indicate an available beam set or a beam management resource set.

Step S207: The terminal device receives the second configuration information.

In this embodiment of this application, the network device may generate the available beam set or the beam management resource set of the terminal device by using the received first feedback information, and then configure the available beam set or the beam management resource set of the terminal device for the terminal device based on the second configuration information. In this embodiment of this application, the available beam set or the beam management resource set may include one or more available beams. For example, in an example of this application, each time the terminal device obtains availability of one beam through measurement, the terminal device may feed back the availability of the beam to the network device. The network device may configure the availability of the beam for the terminal device. Correspondingly, the available beam set includes one available beam. For another example, in an example of this application, after obtaining availability of a plurality of beams through measurement, the terminal device may feed back the availability of the plurality of beams to the network device. The network device may configure the availability of the plurality of beams for the terminal device. Correspondingly, the available beam set may include a plurality of available beams.

For example, the network device receives four pieces of first feedback information, and the four pieces of first feedback information are used to indicate that the first beam is available, the second beam is unavailable, a third beam is available, and a fourth beam is unavailable, respectively. In this case, the available beam set of the terminal device may include {the first beam, the third beam}. Similarly, the beam management resource set of the terminal device may also include {the first beam, the third beam}.

In this embodiment of this application, after the network device configures the available beam set for the terminal device, if a serving beam of the terminal device fails, the terminal device may perform beam failure recovery by using a beam in the available beam set. For example, the foregoing example is still used. The available beam set of the terminal device includes {the first beam, the third beam}. When the current serving beam of the terminal device fails, the terminal device may select the first beam or the third beam from the available beam set to perform the beam failure recovery. Compared with a failure recovery success rate in a case in which the terminal device selects a beam without any reference to perform the beam failure recovery, a failure recovery success rate can be improved in this case.

In this embodiment of this application, after the network device configures the beam management resource set for the terminal device, the terminal device may select a beam from the beam management resource set, to listen to and measure the beam. Compared with power consumption and implementation complexity in a case in which the terminal device listens to and measures all beams (which may include unavailable beams), power consumption and implementation complexity on a terminal device side can be reduced in this case.

In this embodiment of this application, the network device may configure the available beam set or the beam management resource set for the terminal device based on the second configuration information. Compared with uplink resource utilization and a signal detection burden of the terminal device in a case in which the network device configures the available beam set or the beam management resource set for the terminal device without any reference, in this case, uplink resource utilization can be improved, and a signal detection burden of the terminal device is reduced.

Optionally, in this embodiment of this application, for the procedure shown in FIG. 2, the method may further include the following steps.

Step S208: The network device sends third configuration information to another terminal device, where the third configuration information is used to indicate an unavailable beam set of the terminal device.

Step S209: The another terminal device may receive the third configuration information.

For example, the foregoing example is still used. The network device may receive four pieces of first feedback information fed back by a terminal device 1, and generate an unavailable beam set of the terminal device 1. For example, the terminal device 1 sends the four pieces of first feedback information to the network device. The four pieces of first feedback information are used to indicate that for the terminal device 1, the first beam is available, the second beam is unavailable, the third beam is available, and the fourth beam is unavailable, respectively. The network device may generate an unavailable beam set {the second beam, the fourth beam} of the terminal device 1. In this case, the network device may feed back the unavailable beam set {the second beam, the fourth beam} of the terminal device 1 to a terminal device 2, to instruct the terminal device 2 to perform communication by using the unavailable beam set of the terminal device 1, so that no interference is caused to the terminal device 1.

It should be noted that a sequence of step S201 to step S207 is not limited in the procedure shown in FIG. 2 in this application. For example, the network device may first perform step S206, and then perform step S208, or the network device may first perform step S208, and then perform step S206. This is not limited in this application.

Figure 4:
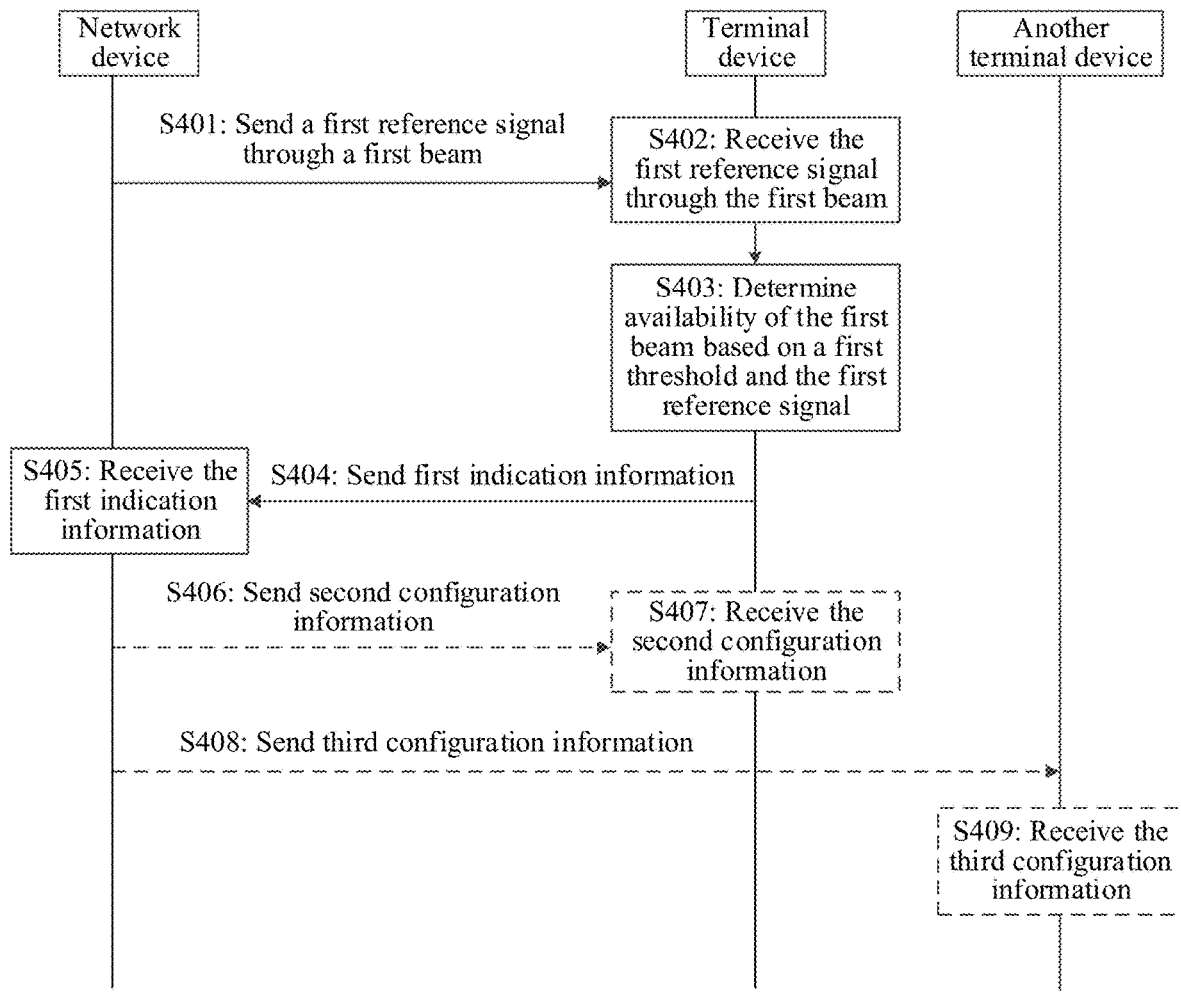
FIG. 4 is a flowchart of a communication method according to an embodiment of this application.

As shown in FIG. 4, this application provides a procedure of a communication method. The communication method is mainly used for downlink beam management of a downlink reference signal. In the procedure shown in FIG. 4, a first reference signal may be specifically the downlink reference signal, and a first beam may be specifically a downlink beam. Step S401 and step S405 may be performed by the network device 101 in the communications system 100 shown in FIG. 1, or may be performed by an apparatus such as a chip or a chip system, that supports a network device in implementing step S401 and step S405. In this embodiment of this application, an example in which step S401 and step S405 are performed by the network device is used for description. Step S402 to step S404 may be performed by the terminal device 102 in the communications system 100 shown in FIG. 1, or may be performed by an apparatus such as a chip or a chip system, that supports a terminal device in implementing step S402 to step S404. In this embodiment of this application, an example in which step S402 to step S404 are performed by the terminal device is used for description.

Step S401: The network device sends the first reference signal through the first beam.

Step S402: The terminal device receives the first reference signal through the first beam.

Step S403: The terminal device determines availability of the first beam based on a first threshold and the first reference signal.

Step S404: The terminal device sends first indication information, where the first indication information is used to indicate the availability of the first beam.

Step S405: The network device receives the first indication information.

For specific implementation of the embodiment shown in FIG. 4, refer to the description of the embodiment shown in FIG. 2. Details are not described herein again.

Similarly, optionally, after step S405, the method may further include the following steps.

Step S406: The network device sends second configuration information, where the second configuration information is used to indicate an available beam set.

Step S407: The terminal device receives the second configuration information.

Similarly, optionally, in this embodiment of this application, the procedure shown in FIG. 4 may further include the following steps.

Step S408: The network device sends third configuration information, where the third configuration information is used to indicate an unavailable beam set of the terminal device.

Step S409: Another terminal device receives the third configuration information.

For a specific implementation process of FIG. 4, refer to the description of FIG. 2. Details are not described herein again. Similarly, it should be noted that in this embodiment of this application, an execution sequence of step S401 to step S409 is not limited. For example, the network device may first perform step S406, and then perform step S408, or the network device may first perform step S408, and then perform step S406. This is not limited in this application.

It can be learned from the foregoing description that in the embodiments of this application, the first thresholds in FIG. 2 and FIG. 4 may be determined by the terminal device, or may be determined by the network device and then notified to the terminal device, or may be predefined in a protocol and then set in the network device and the terminal device.

In the embodiments of this application, if the first threshold is determined by the network device and then notified to the terminal device, the procedures shown in FIG. 2 and FIG. 4 may further include: sending, by the network device, first configuration information to the terminal device; and correspondingly, receiving, by the terminal device, the first configuration information sent by the network device, where the first configuration information may include the first threshold. In the embodiments of this application, a specific location of the foregoing step is not limited. For example, the foregoing step may be performed before step S201 or step S401.

In the embodiments of this application, if the first threshold is determined by the terminal device, the terminal device notifies the network device of the first threshold. In the embodiments of this application, for the procedure shown in FIG. 2, the first feedback information in step S204 may further include second indication information, where the second indication information is used to indicate the first threshold. For the procedure shown in FIG. 4, the procedure shown in FIG. 4 may further include: sending, by the terminal device, second indication information to the network device; and correspondingly, receiving, by the network device, the second indication information, where the second indication information is used to indicate the first threshold.

In the embodiments of this application, a quantity of first thresholds is not limited. There may be one or more first thresholds. For example, there may be one first threshold. Correspondingly, there is one piece of first indication information in FIG. 2 or FIG. 4, and the first indication information is used to indicate the availability of the first beam according to a decision criterion of the foregoing first threshold. Alternatively, there may be a plurality of first thresholds. Correspondingly, there are a plurality of pieces of first indication information in FIG. 2 or FIG. 4, and each piece of first indication information is used to indicate the availability of the first beam according to a decision criterion of a corresponding first threshold. Correspondingly, after receiving the plurality of pieces of first indication information, the network device may perform a corresponding operation. For example, when the plurality of pieces of first indication information all indicate that the first beam is available, the network device performs an operation A; when some of the plurality of pieces of first indication information indicate that the first beam is available, the network device performs an operation B; when the plurality of pieces of first indication information all indicate that the first beam is unavailable, the network device performs an operation C. Alternatively, the first indication information may include N pieces of indication information, and sequence numbers are 1 to N. In this case, the network device may perform a first operation when indication information whose sequence number is 1 indicates that the first beam is available. The network device may perform a second operation when indication information whose sequence number is 2 indicates the availability of the first beam. By analogy, the network device may perform an $N^{th}$ operation when indication information whose sequence number is N indicates the availability of the first beam.

In the embodiments of this application, an example in which there are two first thresholds is used for description. For example, there are two first thresholds: a first threshold A and a first threshold B. The first beam is available according to a decision criterion of the first threshold A, and the first beam is unavailable according to a decision criterion of the first threshold B. Correspondingly, the terminal device may generate first indication information A and first indication information B. The first indication information A is used to indicate that the first beam is available according to the decision criterion of the first threshold A, and the first indication information B is used to indicate that the first beam is unavailable according to the decision criterion of the first threshold B. After receiving the first indication information A and the first indication information B, the network device may perform a corresponding operation, for example, perform the foregoing operation B.

Figure 5:
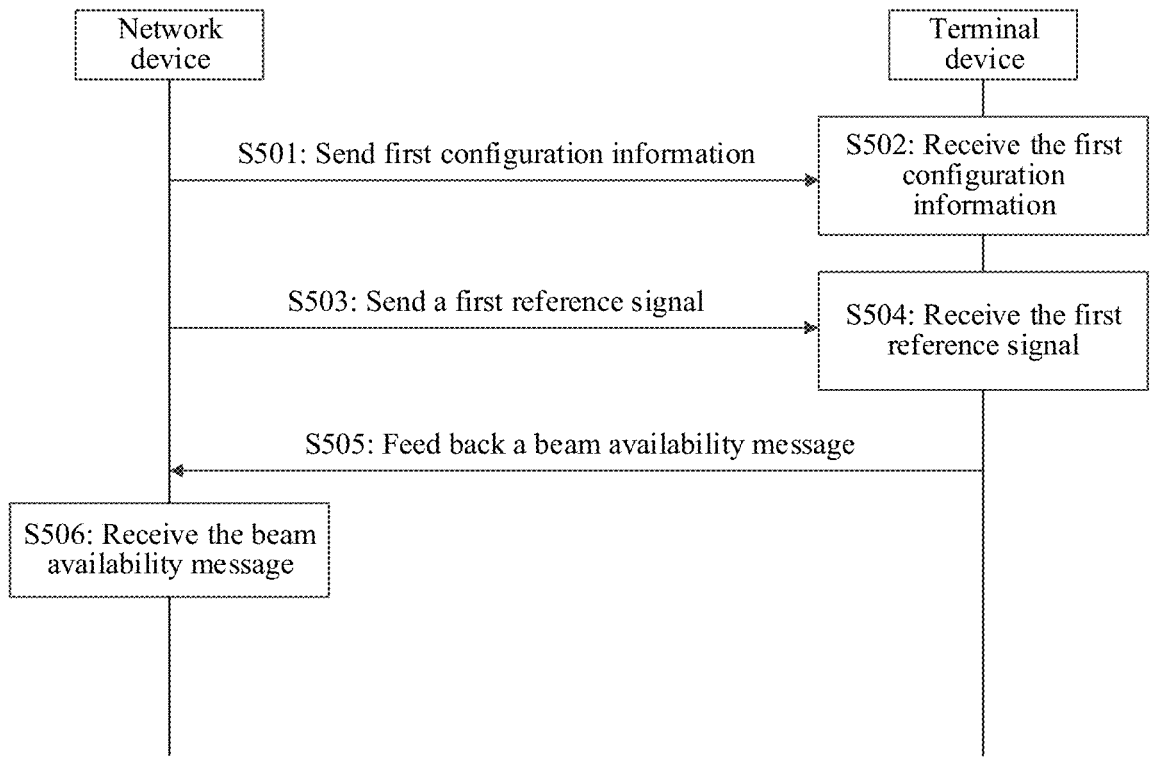
FIG. 5 is a flowchart of a communication method according to an embodiment of this application.

As shown in FIG. 5, this application further provides a procedure of a communication method. In the procedure shown in FIG. 5, the procedure shown in FIG. 2 or FIG. 4 is described in detail by using an example in which the first reference signal is a CSI resource set. The procedure may specifically include the following steps.

Step S501: A network device sends first configuration information.

In this embodiment of this application, the network device may send all or some of the first configuration information through one or more types of signaling. For example, the network device may send the first configuration information to the terminal device by using a downlink resource or channel such as a broadcast channel, a system message, a system message update, a paging message, a downlink control channel, a downlink data channel, or a downlink shared channel, and through radio resource control (RRC) signaling, a MAC-CE, DCI, or the like.

In this embodiment of this application, the first configuration information may include the following content: configuration information of a reference signal, configuration information of a beam availability threshold, and configuration information for feeding back beam availability. The following describes in detail the configuration information of the reference signal, the configuration information of the beam availability threshold, and the configuration information for feeding back the beam availability.

Configuration information of a reference signal:

For example, when the reference signal is a CSI-RS, the configuration information of the reference signal may include configuration information of a CSI resource set, and the CSI resource set may include one or more CSI-RSs.

The configuration information of the CSI resource set may include:

an identifier of each reference signal, for example, a CSI-RS resource ID or a synchronization signal block index (SSB index); and related information about each CSI-RS resource, for example, a time-frequency resource location, a port quantity, a periodicity, and an offset.

In this embodiment of this application, code of a reference signal configuration method may be as follows:

```
-- ASN1START
-- TAG-NZP-CSI-RS-RESOURCESET-START
NZP-CSI-RS-ResourceSet ::=       SEQUENCE {
    nzp-CSI-ResourceSetId        NZP-CSI-RS-ResourceSetId,
    nzp-CSI-RS-Resources         SEQUENCE (SIZE (1..
                                 maxNrofNZP-CSI-
RS- ResourcesPerSet)) OF NZP-CSI-RS-ResourceId,
    repetition                   ENUMERATED { on, off }
                                 OPTIONAL,
    aperiodicTriggeringOffset    INTEGER(0..4)
                                 OPTIONAL,-- Need S
    trs-Info                     ENUMERATED {true}
                                 OPTIONAL,-- Need R
    ...
}
-- TAG-NZP-CSI-RS-RESOURCESET-STOP
-- ASN1STOP
```

In this embodiment of this application, one resource set ID may be allocated to each CSI resource set. Each CSI resource set may include one or more resources. Each resource is also provided with its own identifier. A maximum quantity of resources in a resource set is a maximum quantity of non-zero power CSI-RS resources (maxNrofNZP-CSI-RS-ResourcesPerSet) in the CSI-RS resource set.

Configuration Information of a Beam Availability Threshold:

In this embodiment of this application, one or more thresholds may be configured for the terminal device. The thresholds may be measured by using one or more of an RSRP, RSRQ, an RSSI, an SINR, and a CQI. In the foregoing one or more thresholds, at least one threshold is related to a beam failure recovery configuration threshold.

Configuration information for feeding back beam availability: In this embodiment of this application, the configuration information for feeding back the beam availability may include content, a format, and the like that are reported for feeding back the beam availability, a reported resource configuration, and the like. Content of the third part is described in detail in step S505.

Step S502: The terminal device receives the first configuration information.

Step S503: The network device sends a reference signal based on the configuration information that is of the reference signal and that is in the first configuration information.

Step S504: The terminal device receives the reference signal based on the configuration information that is of the reference signal and that is in the first configuration information, and measures the reference signal.

In this embodiment of this application, beam quality may be determined by measuring the reference signal. The beam quality may be fed back by using one or more of the following parameters: a BLER, the RSRP, the RSRQ, the RSSI, the SINR, the CQI, a PMI, and the like.

Optionally, the network device may also determine a reference signal measurement method. For example, if the network device requires the terminal device to report the RSRP, the terminal device may measure only the RSRP of the terminal device.

Step S505: The terminal device feeds back a beam availability message.

In this embodiment of this application, the terminal device may feed back availability of each beam by using one binary bit. For example, when the beam quality meets the beam availability threshold, the availability of the beam may be marked as 1; when the quality of the beam does not meet the beam availability threshold, the availability of the beam may be marked as 0.

For example, when the entire CSI resource set may include eight CSI-RS resources, and the eight CSI-RS resources are 1, 4, 6, 9, 13, 15, 24, and 63 in descending order of CSI-RS identifiers. The UE measures the resources and determines that beam quality of the resources whose identifiers are 1, 9, 13, and 63 meets the beam availability threshold, and the UE may feed back an 8-bit bitmap {10011001}. The information fed back by the UE indicates that the first, fourth, fifth, and eighth resources in ascending order of resource identifiers meet the threshold.

In this embodiment of this application, a signaling format for feeding back the beam availability by the terminal device may be a MAC PDU, or may be UCI.

Figure 6:
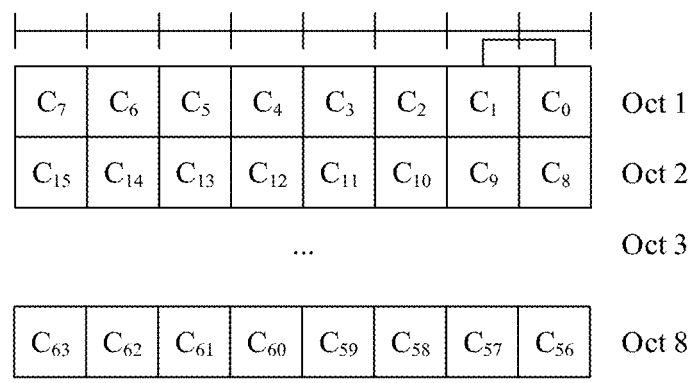
FIG. 6 is a schematic diagram of a MAC CE according to an embodiment of this application.

For example, when the signaling format for feeding back the beam availability by the UE is the MAC PDU, as shown in FIG. 3, the MAC PDU may include packet headers and MCE CEs, and one MAC CE that is in the MAC PDU and that is indicated by one packet subheader is one MAC CE for reporting the beam availability. When a resource set includes 64 CSI-RSs, in other words, when availability of 64 beams is tested at a time, the MAC-CE may be shown in FIG. 6 as an example. The MAC-CE may include eight Octs, where one Oct is one byte and includes eight bits. In FIG. 6, one small box represents one bit, and represents availability of one beam. The MAC-CE shown in FIG. 6 may be a 64-bit fixed-sized MAC CE, a value of C may be 1 or 0, and subscripts of C represent resource identifiers sorted in ascending order in the resource set.

In this embodiment of this application, a signaling format for feeding back the beam availability by the UE may be the UCI, and the UCI may be fixed-sized or variable-sized. 64-bit fixed-sized UCI is used as an example. When beam quality corresponding to an identifier meets the threshold, a value of a bit corresponding to the identifier is 1. When the beam quality corresponding to the identifier does not meet the threshold, the value of the bit corresponding to the identifier is 0. The first bit represents the first resource identifier sorted in ascending order in the resource set. The second bit represents the second resource identifier sorted in ascending order in the resource set. The 3rd bit to the 64th bit can be deduced by analogy.

In this embodiment of this application, optionally, the beam reporting of the terminal device may be combined with the following manner. For example, a reporting manner of the beam quality is {an identifier of a beam #1, an RSRP of the beam #1}. The 64-bit bitmap in this embodiment of this application may indicate a correlation between another beam and the beam #1. For example, "1" indicates a high correlation with the beam #1, and "0" indicates a low correlation with the beam #1. For another example, the 64-bit bitmap in this embodiment of this application may indicate an interference degree caused by another beam to the beam #1. For example, "1" indicates high interference in the beam #1, and "0" indicates low interference in the beam #1. For other examples, the 64-bit bitmap may also indicate whether the another beam and the beam #1 are suitable for forming a multi-beam transmission channel, whether the another beam and the beam #1 are suitable for forming a high-robust transmission combination, and the like.

The foregoing method may be further naturally extended to a case in which the terminal device reports a plurality of beams in an existing reporting manner. For example, the UE reports {the beam #1+an L1-RSRP of the beam #1}, and {the beam #2+a differential L1-RSRP between the beam #2 and the beam #1}. The 64-bit bitmap in this embodiment may be naturally extended to two 64-bit bitmaps. One 64-bit bitmap corresponds to the beam #1, and the other corresponds to the beam #2. The two bitmaps may be reported in groups (with group IDs) or separately (without group IDs).

Optionally, the terminal device may feed back the availability of each beam by using M bits. If there are M beam availability thresholds configured in 501, each bit may correspond to one threshold. For example, when there are two thresholds, two bits may be fed back for each beam, where the first bit indicates whether the beam quality meets a first threshold, and the second bit indicates whether the beam quality meets a second threshold.

Optionally, the terminal device may feed back the availability of each beam by using M bits. For example, the beam quality belongs to one of N intervals, and the UE may feed back, by using M={rounded up log 2(N)} bits, an interval to which each beam quality belongs. Intervals can be divided based on absolute beam quality. For example, the RSRP ranges from −100 dBm to −50 dBm in an interval 1 and from −150 dBm to −100 dBm in an interval 2. Alternatively, intervals can be divided based on relative beam quality. For example, a difference between a beam and the strongest beam ranges from 0 dB to 10 dB in an interval 1, and ranges from 10 dB to 20 dB in an interval 2.

Optionally, a length of the bitmap may be a size of the resource set, or may be a maximum quantity of resources that is allowed in the resource set, for example, 64. The length of the bitmap may be M*a size of the resource set, or may be M*a maximum quantity of resources that is allowed in the resource set. A sequence of resource identifiers corresponding to all bits in the bitmap is configurable, for example, in ascending order or descending order.

In this embodiment of this application, it is not limited to feeding back the beam availability by using the bitmap. Alternatively, the beam availability may be fed back by using an explicit resource identifier number, a logical resource identifier number, or the like.

Step S506: The network device receives the beam availability message.

In this embodiment of this application, after receiving the beam availability message, the network device may update a configuration, to more properly use resources.

For example, the network device may configure all or some of available resources (such as resources that are fed back as 1) of the terminal device as a new beam management resource set.

Alternatively, the network device may not configure unavailable resources (such as resources that are fed back as 0) to a new beam management resource set.

Alternatively, the network device may configure all or some of available resources (such as resources that are fed back as 1) as a new resource set of available beams.

Alternatively, the network device may not configure unavailable resources (such as resources that are fed back as 0) to a new resource set of available beams.

Alternatively, the network device may configure all or some of available resources (such as resources that are fed back as 1) as a set of beam indications (such as TCIs).

Alternatively, the network device may not configure unavailable resources (such as resources that are fed back as 0) to a set of beam indications (such as TCIs).

Alternatively, the network may use unavailable resources (such as resources that are fed back as 0) of the terminal device to serve another terminal device, so that no interference is caused to the foregoing terminal device.

In this embodiment of this application, the availability of each beam may be fed back with low overheads, and more information on a network device side is provided. This helps beam-related resources to be properly configured on the network device side.

Figure 7:
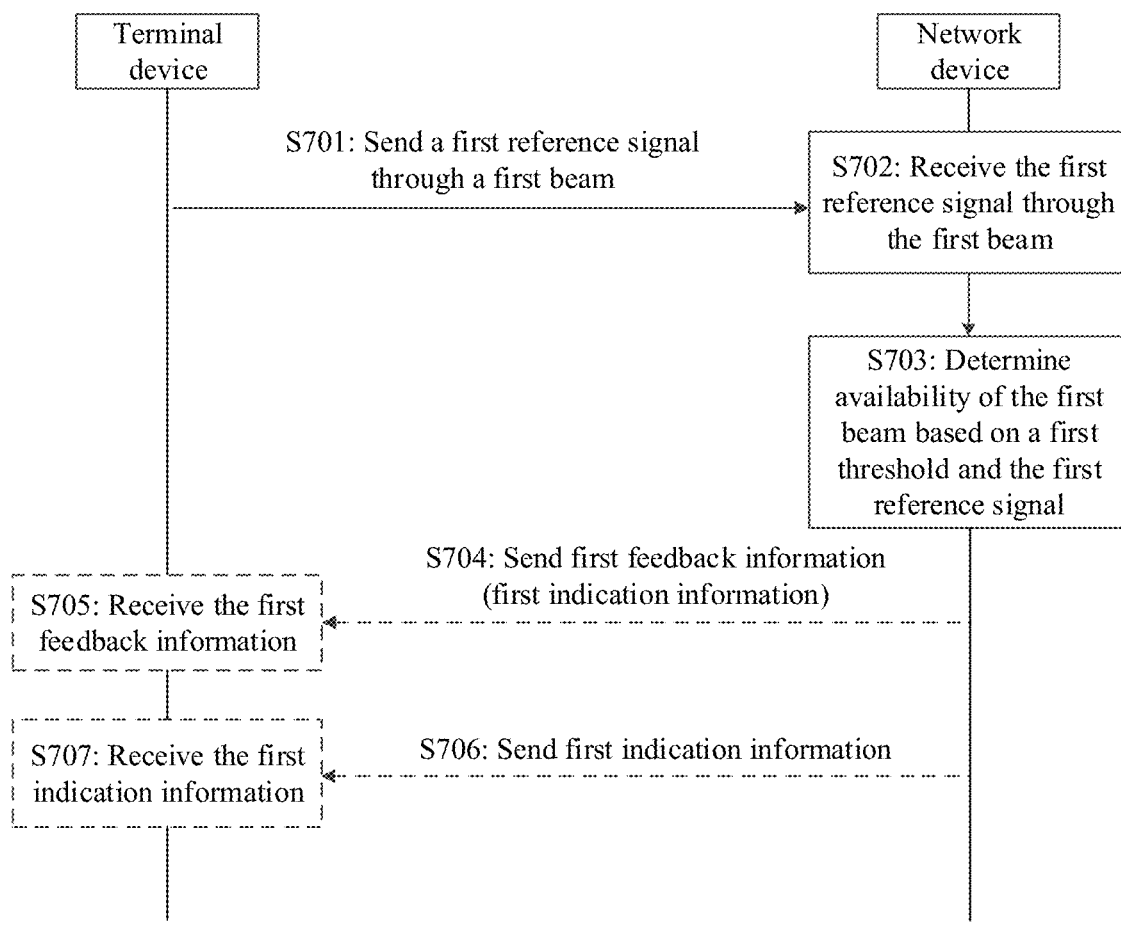
FIG. 7 is another flowchart of a communication method according to an embodiment of this application.

This application further provides a procedure of a communication method. As shown in FIG. 7, the communication method is mainly used for uplink beam management of an uplink reference signal. In the procedure shown in FIG. 7, a first reference signal may be specifically an uplink reference signal, and a first beam may be specifically an uplink beam. Step S701, step S705, and step S707 may be performed by the terminal device 102 in the communications system 100 shown in FIG. 1, or may be performed by an apparatus such as a chip or a chip system, that supports a terminal device in implementing step S701, step S705, and step S707. In this embodiment of this application, an example in which step S701, step S705, and step S707 are performed by the terminal device is used for description. Step S702, step S703, step S704, and step S706 may be performed by the network device 101 in the communications system 100 shown in FIG. 1, or may be performed by an apparatus such as a chip or a chip system, that supports a network device 101 in implementing step S702, step S703, step S704, and step S706. In this embodiment of this application, an example in which step S702, step S703, step S704, and step S706 are performed by the network device is used for description.

Step S701: The terminal device sends the first reference signal through the first beam.

In this embodiment of this application, for description of the first reference signal, refer to detailed description of the embodiment shown in FIG. 2. Details are not described herein again.

Step S702: The network device receives the first reference signal through the first beam.

Step S703: The network device determines availability of the first beam based on a first threshold and the first reference signal.

Step S704: The network device sends first feedback information, where the first feedback information may include first indication information, and the first indication information is used to indicate the availability of the first beam.

Step S705: The terminal device receives the first feedback information.

Optionally, step S704 may alternatively be replaced with step S706, and step S705 may alternatively be replaced with step S707.

Step S706: The network device sends first indication information, where the first indication information is used to indicate the availability of the first beam.

Step S707: The terminal device receives the first indication information.

In this embodiment of this application, for how the network device determines the availability of the first beam based on the first threshold and the first reference signal in step S703, refer to the description of step S203 in FIG. 2. For how the network device sends the first feedback information in step S704, refer to the description of step S204 in FIG. 2. For how the network device sends the first indication information in step S706, refer to step S404 in FIG. 4. Details are not described herein again.

In this embodiment of this application, because the network device directly feeds back the availability of the first beam to the terminal device, compared with air interface overheads in a case in which the network device feeds back an identifier of the first beam and a reference signal received power of the first beam to the terminal device, air interface overheads can be reduced in this embodiment.

Figure 8:
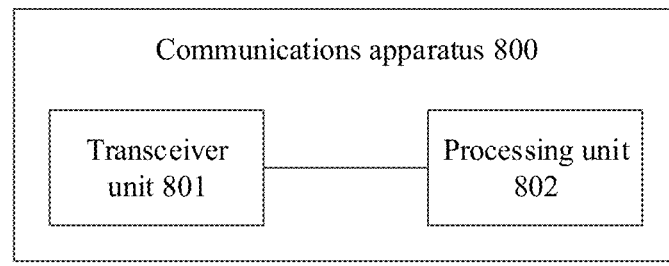
FIG. 8 is a schematic structural diagram of a communications apparatus according to an embodiment of this application.

Based on the foregoing concept, as shown in FIG. 8, this application further provides a communications apparatus 800, and the communications apparatus 800 may include a transceiver unit 801 and a processing unit 802.

In an example of this application, the communications apparatus 800 may be applied to a terminal device, the transceiver unit 801 may be configured to perform S202 and S204 in the procedure shown in FIG. 2, and the processing unit 802 is configured to perform the step shown in S203 in the procedure shown in FIG. 2. For example, specifically, the transceiver unit 801 may be configured to receive a first reference signal from a first beam of a network device. The processing unit 802 may be configured to determine availability of the first beam based on a first threshold and the first reference signal. The transceiver unit 801 may be further configured to send first feedback information to the network device, where the first feedback information includes at least first indication information, and the first indication information is used to indicate the availability of the first beam.

In another example of this application, the communications apparatus 800 may be applied to a terminal device, the transceiver unit 801 may be configured to perform step S402 and step S404 in the procedure shown in FIG. 4, and the processing unit 802 is configured to perform the step shown in step S403. For example, specifically, the transceiver unit 801 may be configured to receive a first reference signal from a first beam of a network device. The processing unit 802 may be configured to determine availability of the first beam based on a first threshold and the first reference signal. The transceiver unit 801 is further configured to send first indication information to the network device.

In another example of this application, the communications apparatus 800 may be applied to a network device, the transceiver unit 801 may be configured to perform S201 and S205 in the procedure shown in FIG. 2, and the processing unit 802 is configured to perform a step of generating a first reference signal. For example, specifically, the processing unit 802 may be configured to generate the first reference signal. The transceiver unit 801 may be configured to: send the first reference signal to a terminal device through a first beam, and receive first feedback information from the terminal device, where the first feedback information is determined based on the first reference signal and a first threshold, the first feedback information includes at least first indication information, and the first indication information is used to indicate availability of the first beam.

In another example of this application, the communications apparatus 800 may be applied to a network device, the transceiver unit 801 may be configured to perform step S401 and step S405 in the procedure shown in FIG. 4, and the processing unit 802 is configured to perform a step of generating a first reference signal. For example, specifically, the processing unit 802 may generate the first reference signal. The processing unit 802 may be configured to: send the first reference signal to a terminal device through a first beam, and receive first indication information from the terminal device, where the first indication information is used to indicate availability of the first beam.

In this embodiment of this application, for a specific description of the communications apparatus 800, refer to the description of the procedure shown in FIG. 2 or FIG. 4. Details are not described herein again.

Figure 9:
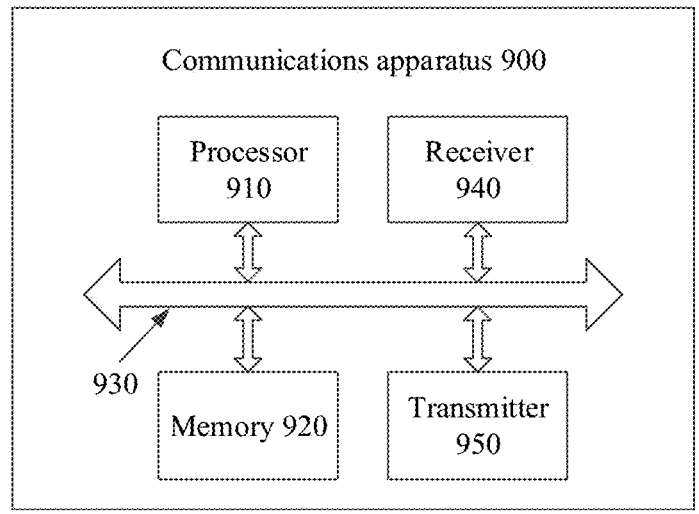
FIG. 9 is another schematic structural diagram of a communications apparatus according to an embodiment of this application.

Based on the foregoing concept, as shown in FIG. 9, an embodiment of this application further provides a communications apparatus 900. The communications apparatus 900 may correspond to the network device in the foregoing methods, or may correspond to the terminal device in the foregoing methods. This is not limited herein.

The communications apparatus 900 may include a processor 910 and a memory 920. Further, the apparatus 900 may further include a receiver 940 and a transmitter 950. Furthermore, the apparatus 900 may include a bus system 930.

The processor 910, the memory 920, the receiver 940, and the transmitter 950 are connected to each other via the bus system 930. The memory 920 is configured to store an instruction. The processor 910 is configured to: execute the instruction stored in the memory 920, to control the receiver 940 to receive a signal and control the transmitter 950 to send a signal, thereby completing steps of the network device or the terminal device in the foregoing methods.

The receiver 940 and the transmitter 950 may be a same physical entity or different physical entities, and may be collectively referred to as a transceiver. The memory 920 may be integrated into the processor 910, or may be disposed separately from the processor 910.

In an implementation, it may be considered that functions of the receiver 940 and the transmitter 950 are implemented by using a transceiver circuit or a dedicated transceiver chip. It may be considered that the processor 910 is implemented by using a dedicated processing chip, a processing circuit, a processor, or a universal chip.

In another implementation, it may be considered that the network device or the terminal device provided in this embodiment of this application is implemented by using a computer. To be specific, program code for implementing functions of the processor 910, the receiver 940, and the transmitter 950 is stored in a memory, and a general purpose processor implements the functions of the processor 910, the receiver 940, and the transmitter 950 by executing the code stored in the memory.

For concepts, explanations, detailed descriptions, and other steps that are involved in the apparatus and related to the technical solution provided in this embodiment of the present invention, refer to the description about the content in the foregoing method or in another embodiment. Details are not described herein again.

In an example of this application, the communications apparatus 900 may be applied to the terminal device. The communications apparatus 900 may be configured to perform the steps performed by the terminal device in the procedure shown in FIG. 2 or FIG. 4. For example, the receiver 940 may receive a first reference signal from a first beam of the network device. The processor 910 is configured to determine availability of the first beam based on a first threshold and the first reference signal. The transmitter 950 is configured to send first feedback information to the network device, where the first feedback information includes first indication information, and the first indication information is used to indicate the availability of the first beam.

In another example of this application, the communications apparatus 900 may be applied to the network device. The communications apparatus 900 may be configured to perform the steps performed by the network device in the procedure shown in FIG. 2 or FIG. 4. For example, the transmitter 950 may send a first reference signal to the terminal device through a first beam. The receiver 940 may receive first feedback information from the terminal device, where the first feedback information is determined based on the first reference signal and a first threshold, the first feedback information includes at least first indication information, and the first indication information is used to indicate availability of the first beam.

Figure 10:
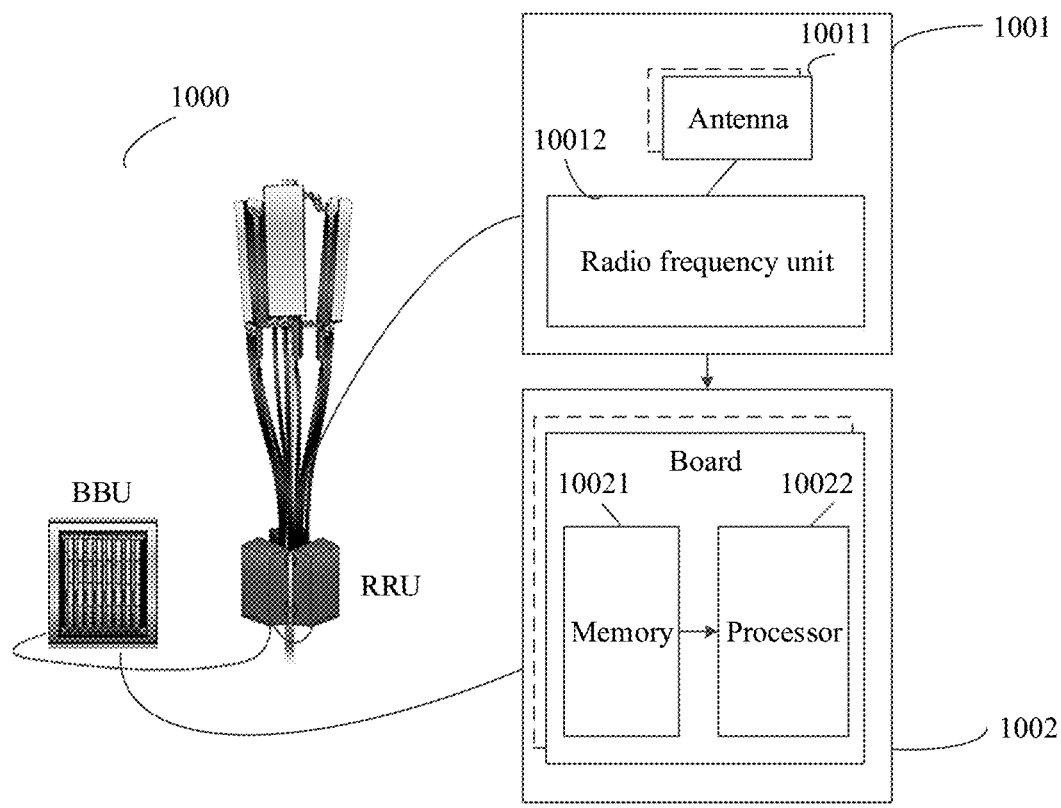
FIG. 10 is a schematic structural diagram of a base station according to an embodiment of this application.

Based on the foregoing conception, FIG. 10 is a schematic structural diagram of a network device such as a base station further provided in this application.

The base station may be applied to a scenario of the communications system shown in FIG. 1, and the base station may be the network device shown in FIG. 2, FIG. 4, FIG. 5, or FIG. 7. The base station may be configured to perform the steps performed by the network device in the procedure shown in FIG. 2, FIG. 4, FIG. 5, or FIG. 7. Specifically, a base station 1000 may include one or more radio frequency units, such as a remote radio unit (RRU) 1001 and one or more baseband units (BBU) (which may also be referred to as digital units (DU)) 1002. The RRU 1001 may be a transceiver unit, a receiver/transmitter, a transceiver circuit, a transceiver, or the like, and may include at least one antenna 10011 and a radio frequency unit 10012. The RRU 1001 part may be configured to receive and send a radio frequency signal and perform conversion between a radio frequency signal and a baseband signal, for example, configured to send the first reference signal, the first indication information, or the first feedback information in the foregoing embodiments to user equipment. The BBU 1002 part may be configured to: perform baseband processing, control the base station, and the like. The RRU 1001 and the BBU 1002 may be physically disposed together, or may be physically disposed separately, that is, a distributed base station.

The BBU 1002 is a control center of the base station, may also be referred to as a processing unit, and is configured to complete a baseband processing function such as channel coding, multiplexing, modulation, and spreading. For example, the BBU (processing unit) may be configured to control the base station to perform the method in the procedure shown in FIG. 2, FIG. 4, FIG. 5, or FIG. 7.

In an example, the BBU 1002 may include one or more boards, and a plurality of boards may jointly support a radio access network (such as an NR network) in a single access standard, or may separately support radio access networks in different access standards. The BBU 1002 may further include a memory 10021 and a processor 10022. The memory 10021 is configured to store an instruction and data that are necessary. For example, the memory 10021 stores an instruction of "receiving a first reference signal, determining availability of a first beam based on the first reference signal and a first threshold, and sending first indication information" in the foregoing embodiments, and the processor 10022 is configured to control the base station to perform a necessary action. The memory 10021 and the processor 10022 are configured to serve one or more boards. To be specific, a memory and a processor may be disposed on each board, or a plurality of boards may share a same memory and processor. In addition, a necessary circuit may be further disposed on each board.

Figure 11:
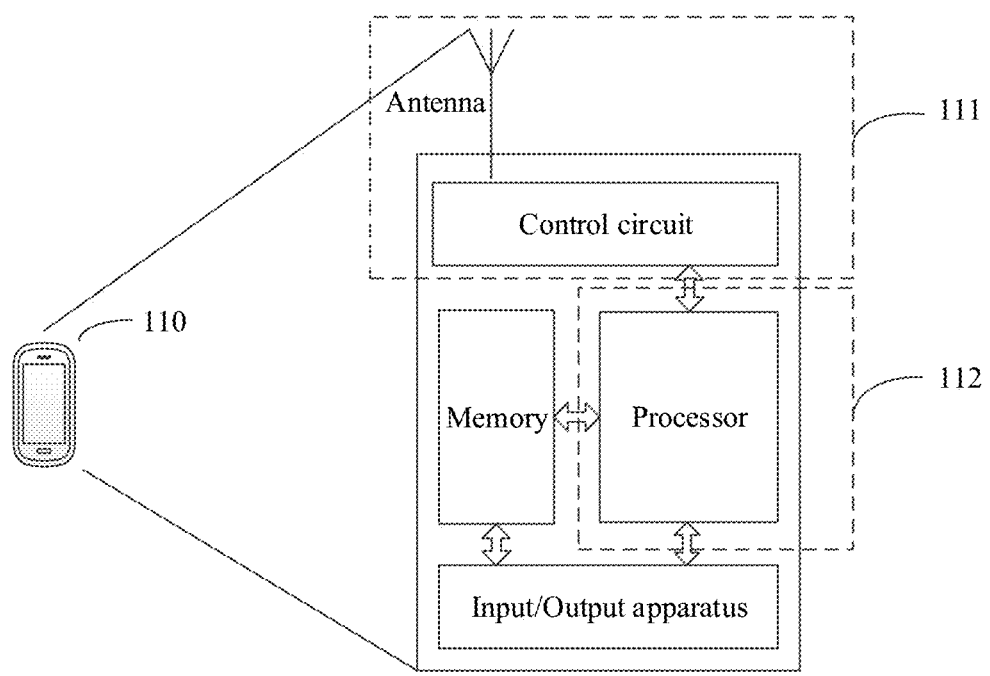
FIG. 11 is a schematic structural diagram of a terminal device according to an embodiment of this application.

Based on the foregoing concept, FIG. 11 is a schematic structural diagram of a terminal device. The terminal device may be applicable to the steps performed by the terminal device in the procedure shown in FIG. 2, FIG. 4, or FIG. 7. For ease of description, FIG. 11 shows only main components of the terminal device. As shown in FIG. 11, a terminal device 110 may include a processor, a memory, and a control circuit, and, optionally, may further include an antenna and/or an input/output apparatus. The processor may be configured to: process a communications protocol and communications data, control user equipment, execute a software program, and process data of the software program. The memory may store the software program and/or the data. The control circuit may be configured to: perform conversion between a baseband signal and a radio frequency signal, and process the radio frequency signal. The control circuit together with the antenna may also be referred to as a transceiver, and may be configured to receive and send a radio frequency signal in an electromagnetic wave form. The input/output apparatus such as a touchscreen, a display, or a keyboard may be configured to receive data entered by a user and output data to the user.

In this embodiment of this application, the processor may read the software program in the memory, interpret and execute an instruction of the software program, and process the data of the software program. When data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the user equipment, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 11 shows only one memory and only one processor. In actual user equipment, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor may be configured to process a communications protocol and communications data. The central processing unit may be configured to: control the entire user equipment, execute the software program, and process the data of the software program. The processor in FIG. 11 is integrated with functions of the baseband processor and the central processing unit. A person skilled in the art may understand that, the baseband processor and the central processing unit may be independent processors, and are interconnected through a technology such as a bus. A person skilled in the art may understand that the user equipment may include a plurality of baseband processors to adapt to different network standards, the user equipment may include a plurality of central processing units to enhance a processing capability of the user equipment, and components of the user equipment may be connected via various buses. The baseband processor may also be expressed as a baseband processing circuit or a baseband processing chip. The central processing unit may also be expressed as a central processing circuit or a central processing chip. The function of processing the communications protocol and the communications data may be built in the processor, or may be stored in the memory in a form of a software program, and the processor executes the software program to implement a baseband processing function.

For example, in this embodiment of this application, the antenna and the control circuit that have receiving and sending functions may be used as a transceiver unit 111 of the terminal device 110, and the processor that has a processing function may be considered as a processing unit 112 of the terminal device 110. As shown in FIG. 11, the terminal device 110 may include the transceiver unit 111 and the processing unit 112. The transceiver unit may also be referred to as a transceiver, a receiver/transmitter, a transceiver apparatus, or the like. Optionally, a component that is in the transceiver unit 111 and that is configured to implement a receiving function may be considered as a receiving unit, and a component that is in the transceiver unit 111 and that is configured to implement a sending function may be considered as a sending unit. That is, the transceiver unit 111 includes the receiving unit and the sending unit. For example, the receiving unit may also be referred to as a receiving machine, a receiver, a receive circuit, or the like, and the sending unit may be referred to as a transmitting machine, a transmitter, a transmit circuit, or the like.

It should be understood that the network device and the terminal device in the foregoing apparatus embodiments completely correspond to the network device and the terminal device in the method embodiments respectively, and a corresponding module or unit performs a corresponding step. For example, a sending module (transmitter) performs a sending step in the method embodiments, a receiving module (receiver) performs a receiving step in the method embodiments, and a processing module (processor) may perform other steps other than sending and receiving. For a function of a specific module, refer to corresponding method embodiments. The sending module and the receiving module may form a transceiver module, and the transmitter and the receiver may form a transceiver to jointly implement receiving and sending functions. There may be one or more processors.

According to the method provided in the embodiments of this application, an embodiment of the present invention further provides a communications system, including the foregoing network device and the foregoing terminal device.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process the information or the message in the foregoing methods. Optionally, the chip further includes a memory, and the memory is configured to store a program instruction and data that are necessary and executed by the processor. The chip may include a chip, or may include a chip and another discrete device.

It should be understood that in the embodiments of the present invention, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or may be any conventional processor or the like.

The memory may include a read-only memory and a random access memory, and provide an instruction and data to the processor. A part of the memory may further include a nonvolatile random access memory.

The bus system may further include a power bus, a control bus, a status signal bus, and the like, in addition to a data bus. However, for clear description, various types of buses in the figures are marked as the bus system. In an implementation process, steps in the foregoing methods can be implemented by using a hardware integrated logic circuit in the processor, or by using instructions in a form of software. The steps of the methods disclosed with reference to the embodiments of the present invention may be directly performed and completed by a hardware processor, or may be performed and completed by using a combination of a software module and hardware that is in the processor. The software module may be located in a mature storage medium in the field, for example, a random access memory, a flash memory, a read-only memory, a programmable read-only memory, an electrically erasable programmable memory, or a register. The storage medium is located in the memory, and the processor reads information in the memory, and completes the steps in the foregoing methods by using the information in the memory and hardware of the processor. To avoid repetition, details are not described herein again. In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions (programs). When the computer programs or instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, comprising:
   receiving, by a terminal device, a reference signal from a beam of a network device;
   determining, by the terminal device, one or a plurality of thresholds, wherein:
      if one threshold is determined, generating, by the terminal device, feedback information comprising a piece of indication information indicating availability of the beam based on the one threshold and the reference signal; and
      if a plurality of thresholds are determined, generating, by the terminal device, feedback information comprising a plurality of pieces of indication information indicating availability of the beam based on a decision criterion of each of the plurality of the thresholds; and
   sending, by the terminal device, the feedback information to the network device.

2. The method according to claim 1, wherein the method further comprises:
   receiving, by the terminal device from the network device, configuration information that comprises the one threshold or the plurality of thresholds.

3. The method according to claim 1, wherein the feedback information further indicates the one threshold or the plurality of thresholds.

4. The method according to claim 1, wherein a signaling format of the feedback information is a media access control protocol data unit, the media access control protocol data unit comprises a control element that carries indication information comprised in the feedback information.

5. The method according to claim 1, further comprising:
   before generating the feedback information, determining, by the terminal device, the availability of the beam based on:
      determining a quality parameter associated with the reference signal; and
      determining that the beam is available in response to determining that the quality parameter is greater than or equal to the one threshold or the plurality of thresholds.

6. The method according to claim 5, wherein the quality parameter comprises one or more of the following:
   a reference signal received power, reference signal received quality, a reference signal received strength indicator, a signal to interference plus noise ratio, a signal quality indicator, a rank indicator, or a precoding matrix indicator.

7. A communication method, comprising:
   sending, by a network device, a reference signal to a terminal device through a beam; and
   receiving, by the network device, feedback information from the terminal device, wherein the feedback information is determined based on the reference signal and one or a plurality of thresholds determined by the terminal device, wherein:
      if one threshold is determined, the feedback information comprises a piece of indication information indicating availability of the beam based on the one threshold and the reference signal; and
      if a plurality of thresholds are determined, the feedback information comprises a plurality of pieces of indication information indicating availability of the beam based on a decision criterion of each of the plurality of the thresholds.

8. The method according to claim 7, wherein the method further comprises:
   sending, by the network device to the terminal device, configuration information that comprises the one threshold or the plurality of thresholds.

9. The method according to claim 7, wherein a signaling format of the feedback information is a media access control protocol data unit, the media access control protocol data unit comprises a control element that carries indication information comprised in the feedback information.

10. The method according to claim 8, wherein the configuration information is first configuration information, the method further comprises:
    generating, by the network device, an available beam set based on the feedback information; and
    sending, by the network device to the terminal device, second configuration information that indicates the available beam set.

11. A communications apparatus, comprising:
    at least one processor; and
    one or more memories coupled to the at least one processor and storing programming instructions for execution by the at least one processor, the programming instructions instructing the at least one processor to:
       receive a reference signal from a beam of a network device;
       determine one or a plurality of thresholds, wherein:
          if one threshold is determined, generate feedback information comprising a piece of indication information indicating availability of the beam based on the one threshold and the reference signal; and
          if a plurality of thresholds are determined, generate feedback information comprising a plurality of pieces of indication information indicating availability of the beam based on a decision criterion of each of the plurality of the thresholds; and
       send the feedback information to the network device.

12. The communications apparatus according to claim 11, wherein the programming instructions further instructing the at least one processor to:
   receive configuration information that comprises the one threshold or the plurality of thresholds from the network device.

13. The communications apparatus according to claim 11, wherein a signaling format of the feedback information is a media access control protocol data unit, the media access control protocol data unit comprises a control element that carries indication information comprised in the feedback information.

14. The communications apparatus according to claim 11, wherein the programming instructions further instructing the at least one processor to:
   before generating the feedback information, determine the availability of the beam based on:
      determine a quality parameter associated with the reference signal; and
      determine that the beam is available in response to determining that the quality parameter is greater than or equal to the one threshold or the plurality of thresholds.

15. The communications apparatus according to claim 14, wherein the quality parameter comprises one or more of the following:
   a reference signal received power, reference signal received quality, a reference signal received strength indicator, a signal to interference plus noise ratio, a signal quality indicator, a rank indicator, or a precoding matrix indicator.

16. A communications apparatus, comprising:
   at least one processor; and
   one or more memories coupled to the at least one processor and storing programming instructions for execution by the at least one processor, the programming instructions instructing the at least one processor to:
      send a reference signal to a terminal device through a beam; and
      receive feedback information from the terminal device, wherein the feedback information is determined based on the reference signal and one or a plurality of thresholds determined by the terminal device, wherein:
         if one threshold is determined, the feedback information comprises a piece of indication information indicating availability of the beam based on the one threshold and the reference signal; and
         if a plurality of thresholds are determined, the feedback information comprises a plurality of pieces of indication information indicating availability of the beam based on a decision criterion of each of the plurality of the thresholds.

17. The communications apparatus according to claim 16, wherein the programming instructions further instructing the at least one processor to:
   send configuration information that comprises the one threshold or the plurality of thresholds to the terminal device.

18. The communications apparatus according to claim 16, wherein a signaling format of the feedback information is a media access control protocol data unit, the media access control protocol data unit comprises a control element that carries indication information comprised in the feedback information.

19. The communications apparatus according to claim 16, wherein the programming instructions further instructing the at least one processor to:
   generate an available beam set based on the feedback information; and
   send second configuration information that indicates the available beam set to the terminal device.

* * * * *